Figure 4:
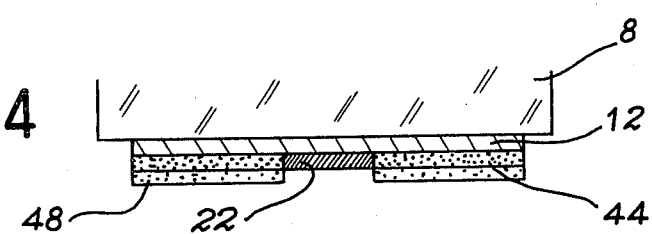

United States Patent [19]

Grange et al.

[11] 4,431,989
[45] Feb. 14, 1984

[54] APPARATUS FOR ELECTROLYTIC CLEAR DISPLAY ON A DULL BASE

[75] Inventors: Hubert Grange, Grenoble; Robert Meyer, Saint Ismier, both of France

[73] Assignee: Commissariat a l'Energie Atomique, Paris, France

[21] Appl. No.: 279,057

[22] Filed: Jun. 30, 1981

[30] Foreign Application Priority Data

Jul. 3, 1980 [FR] France .................. 80 14838

[51] Int. Cl.³ ............................................. G09G 3/16
[52] U.S. Cl. .................................. 340/763; 340/785; 350/357; 350/363
[58] Field of Search ............... 350/363, 357; 340/763, 340/783, 785, 784

[56] References Cited

U.S. PATENT DOCUMENTS

| 4,117,475 | 9/1978 | Ebihara et al. | 340/785 |
| 4,175,836 | 11/1979 | Redman et al. | 340/785 |
| 4,277,786 | 7/1981 | Waldron | 340/784 |
| 4,309,083 | 1/1982 | Duchene et al. | 350/363 |

FOREIGN PATENT DOCUMENTS

| 52-48997 | 4/1977 | Japan | 340/785 |
| 53-39099 | 4/1978 | Japan | 340/785 |

Primary Examiner—Marshall M. Curtis
Attorney, Agent, or Firm—Kerkam, Stowell, Kondracki & Clarke

[57] ABSTRACT

Electrolytic device for light display on a dark background comprising a light source which illuminates a cell formed by two insulating walls between which is an electrolyte. One wall has an electrode comprising a plurality of segments for display and the other wall has a counter-electrode. The display is obtained by electrochemical deposition of dark coating material on the electrode.

16 Claims, 9 Drawing Figures

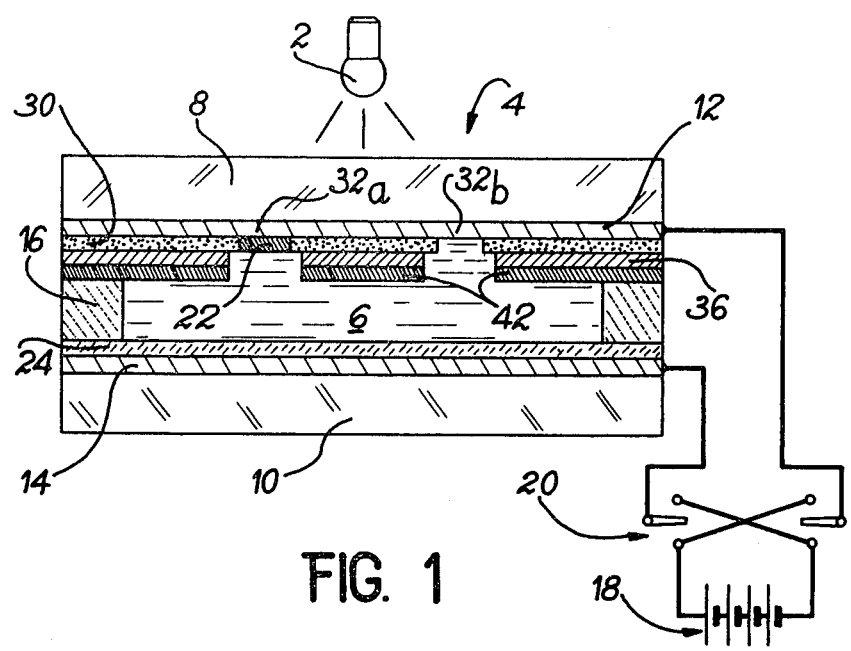
FIG. 1
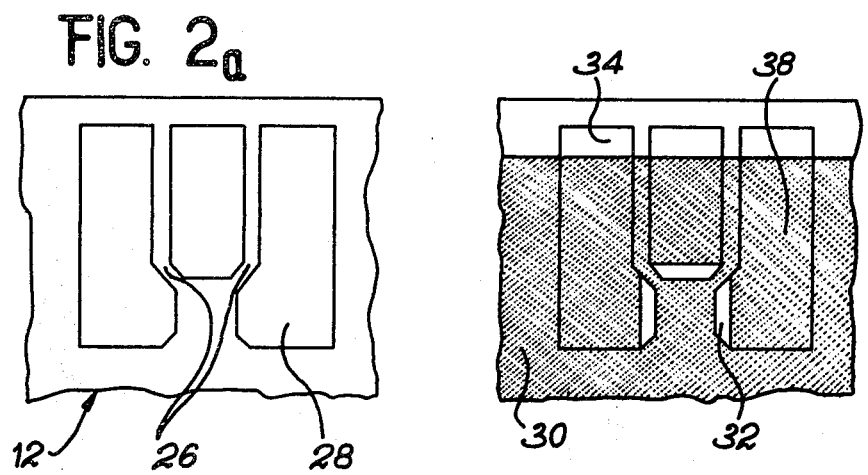
FIG. 2a
FIG. 2b
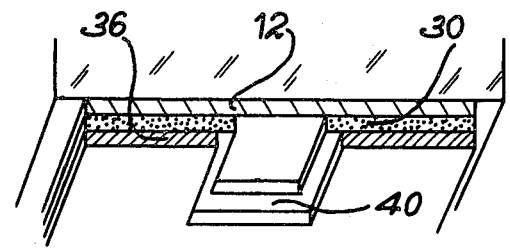
FIG. 3

APPARATUS FOR ELECTROLYTIC CLEAR DISPLAY ON A DULL BASE

The present invention relates to a light electrolytic display on a dark background. The invention is used in optoelectronics and particularly in the display of alphanumeric characters.

Generally, an electrolytic display comprises a light source illuminating a cell formed by two insulating walls between which is inserted an electrolyte. One of these walls is provided with an electrode constituted, for example, by a plurality of segments used for the display, whilst the other wall comprises a counter-electrode which faces the electrode. This display also comprises electricity supply means connected to the electrodes.

In connection with such a display means, the display is obtained by depositing or dissolving on the electrode by an electrochemical reaction a coating, whose optical properties (reflection, transmission or absorption) are able to give rise to a symbol (characters, curves, segments, etc).

In certain displays, the coating deposited by an electrochemical reaction is an absorbent metal coating (particularly in the case of silver coatings). In other cases, it is a question of an absorbent organic coating (particularly in the case of diheptyl viologen).

With such display means, it is the dark coloured organic or metal coating deposited, which defines the display of the alphanumeric characters on a light background, which may be coloured.

In order to improve the display and in particular prevent too great a brightness of the display panel (dashboard in the case of automobiles or aircraft) a so-called reversed display is used, i.e. light on a dark background. This is already obtained in liquid crystal devices (effects obtained by inversion of polarizers in liquid crystals) and in electromechanical displays. At present, no electrolytic display means is known which provides a reversed display.

The present invention makes it possible to obtain a light electrolytic display on a dark background.

This electrolytic display of the type described hereinbefore comprises means for giving the excited segments of the electrodes a first dark appearance, means for giving the unexcited segments of the electrode a light appearance, said segments constituting those which are to be displayed and means for giving the entire segment-free surface of the electrode a second dark appearance identical to the first.

According to a preferred embodiment of the invention, the means for giving the first dark appearance are constituted by a first dark deposit obtained by electrochemical reaction from the ions contained in the electrolyte. This first dark deposit is preferably constituted by absorbent silver as defined in French Patent Application 76 15103 filed by the present Applicant on May 19th 1976 and entitled "Electrolytic display with an absorbent deposit".

According to another preferred embodiment of the invention, the means for giving the light appearance are constituted by a uniformly coloured porous screen positioned in front of the conductive coating associated with the second wall and in contact with the electrolyte. Such a porous screen is described in French Patent Application No. 77 16676 filed on June 1st 1977 by the present Applicant and entitled "Electrolytic display cell with a porous screen".

According to another further preferred embodiment of the invention, the means for giving the second dark appearance are constituted by a second conductive dark deposit. This second conductive deposit is preferably of absorbent silver or platinum, the latter being deposited in an oxygen atmosphere.

According to yet another preferred embodiment of the invention, the means for giving the second dark appearance are constituted by a second insulating dark deposit of an oxide from the group including $Al_2O_{3-x}$ and $Ta_2O_{3-x}$ in which x is a number below 3.

Other features and advantages of the invention can be gathered from the following description of a non-limitative embodiment and with reference to the attached drawings, wherein are shown:

FIG. 1 diagrammatically, a sectional view of a first embodiment of the display according to the invention.

FIGS. 2A and 2B diagrammatically, the etching of the segments forming the electrode.

FIG. 3 diagrammatically, a perspective view of the display of FIG. 1.

FIG. 4 diagrammatically, a second embodiment of the display according to the invention.

Figure 5:
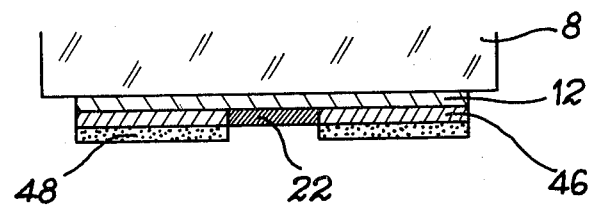

FIG. 5 diagrammatically, a third embodiment of the display according to the invention.

Figure 6:
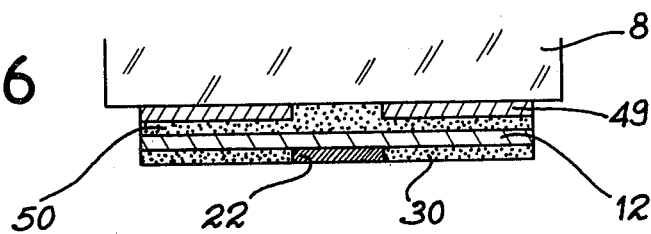

FIG. 6 diagrammatically, a fourth embodiment of the display according to the invention.

Figure 7:
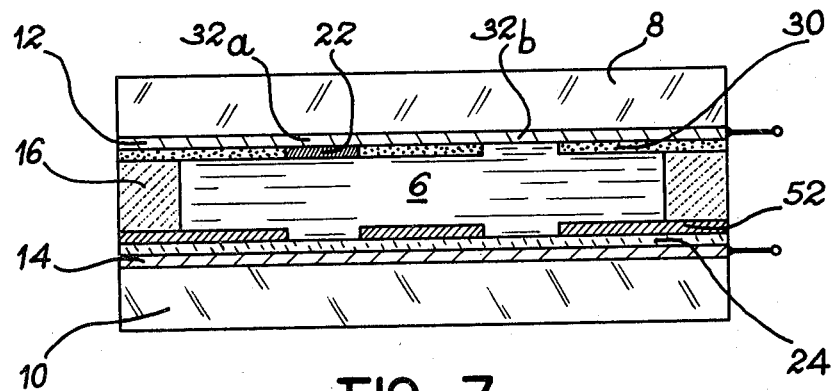

FIG. 7 diagrammatically, a fifth embodiment of the display according to the invention.

Figure 8:
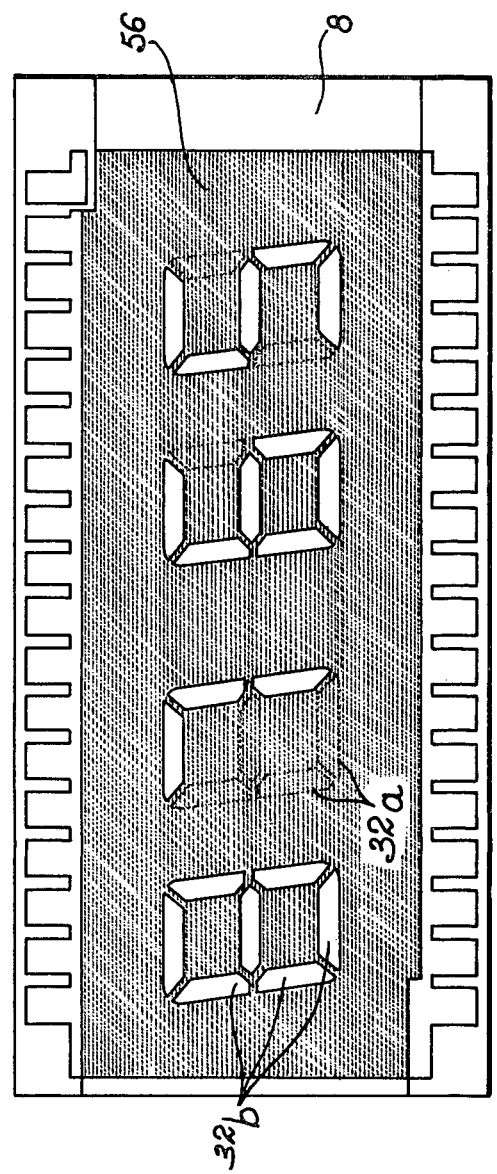

FIG. 8 diagrammatically, a display obtained with the display means according to the invention.

The electrolytic display shown in FIG. 1 comprises a light source 2 which illuminates a cell 4 constituted by an electrolyte 6 placed between two insulating walls, namely a first transparent wall 8 and a second wall 10. The two walls 8 and 10 are covered respectively with a conductive coating 12, 14 facing one another.

In this embodiment, coating 12 forms a transparent electrode and has a structure which is suitable for the display (point matrix, segments, etc.) to be described hereinafter. Coating 14 forms a counter-electrode. Counter-electrode 14 may or may not be transparent, as a function of whether the display operates in reflection or in transmission (reference should be made in French Application No. 76 15103). Insulating shims 16 maintain the reciprocal spacing of walls 8, 10. The conductive coatings 12, 14 are connected to a power source 18 via a switch 20 making it possible to apply a continuous potential difference in one or other direction between coatings 12 and 14.

Electrochemical oxidoreduction reactions lead to the deposition or dissolving on electrode 12 (as a function of the polarity) of a first dark conductive deposit 22, which is preferably formed by absorbent silver.

Moreover, according to the invention, cell 4 also has a light screen 24, which is porous to ions and uniformly coloured, placed in front of counter-electrode 14 and in contact with electrolyte 6. Through the use of a light screen 24, it is possible to obtain a light display on a dark background.

The electrode 12, which is of a form suitable for the display, is shown in greater detail in FIG. 2 Electrode 12 is, for example, constituted by a conductive oxide coating having 30 to $50\mu$ wide grooves 26 (FIG. 2a) etched in the electrode so as to insulate the power supply areas 28 from one another.

In this first embodiment, the electrode is covered with an insulating coating 30 (FIG. 2b), which is preferably of silica and which is etched in accordance with the motifs or patterns to be displayed. The thickness of silica coating 30 can exceed that of the first deposit 32.

In the present case, motifs 32 are in the form of segments, but any other shape can also be considered. Electrical contacts 34 make it possible to supply power to the different segments 32 via power source 18. An example of such an electrode is described in French Patent Application No. 79 16740 filed by the present Applicant on June 28th 1979 and entitled "Control electrode systems for a seven-segment digital display".

In this first embodiment of the display according to the invention, the insulating coating 30 is covered with a conductive oxide coating 36 shown in FIGS. 1 and 3. Oxide coating 36 is deposited along the complementary portion 38 of motif 32 etched in insulating coating 30 and so as to leave an insulating border 40 between electrode 12 and oxide coating 36 (FIG. 3). This makes it possible to provide a good insulation between each motif of segment 32 and the complementary portion 38 (FIG. 2b).

To obtain a light electrolytic display on a dark background, it is necessary to deposit a second dark deposit 42 (FIG. 1) which, in this first embodiment, is constituted like the first dark deposit 22, by absorbent silver.

To this end, the conductive oxide coating 36 is excited by the display voltage in the same way as the undisplayed segments 32a. The unexcited displayed segments 32b remain transparent and lead to the clear screen 24.

FIG. 4 shows a second embodiment of the display according to the invention. To simplify the description, only that part thereof which differs from that of the first embodiment is shown.

In this embodiment, the second dark deposit 44 is directly deposited on electrode 12 etched as hereinbefore (FIG. 2a). This second deposit 44 etched in accordance with the motifs to be displayed (FIG. 2b) is constituted by an oxide of type $Al_2O_{3-x}$ or $Ta_2O_{3-x}$, in which x is a number below 3. These oxides serve both as a dark deposit in order to obtain a clear display on a dark background like porous screen 24 and as an insulant, i.e. the function performed by insulating coating 30 in the first embodiment. If coating 44 failed to provide an adequate insulation, it would be possible to add an insulating coating like coating 48 of the third embodiment.

From the optical standpoint, the display obtained is better than that obtained in the first embodiment, due to the fact that the first dark deposit 22 deposited by electrochemical reaction takes place at the same level as the second dark deposit 44.

Although the nature of this deposit 44 differs from that constituting the first deposit 22 of absorbent silver, the optical appearance of these two deposits is identical.

FIG. 5 shows a third embodiment of the display according to the invention. As in the embodiment shown in FIG. 4, the second dark deposit 46 is directly deposited on the electrode 12 and the first dark deposit 22 is at the same level as deposit 46. In this embodiment, the second dark deposit 46 is provided by a conductive metal coating, preferably of oxidized platinum, The platinum is in fact deposited in an oxygen atmosphere, so that its appearance is less bright than that of pure platinum and hence it resembles more closely the first dark deposit 22 of absorbent silver. It should be noted that this resemblance between oxidized platinum and the electrochemically deposited silver is better than that obtained between silver deposited by screen process printing and electrolytically.

As hereinbefore, this second platinum deposit 46 must be etched (FIG. 2b) so as to prevent any short-circuit between the various power supply areas 28. As platinum is conductive, it must be covered with an insulating coating 38, preferably of silica, to prevent any electrolytic deposit on its surface.

FIG. 6 shows a fourth embodiment of the display according to the invention. In this embodiment, the second dark deposit 49 is directly applied to the first insulating wall 8 and is etched as hereinbefore (FIG. 2b). This second deposit 49 of oxidized platinum is covered with an insulating coating 50, preferably of silica. This insulating coating 50 is covered by electrode 12 etched in the manner indicated hereinbefore (FIG. 2a). The electrode is itself covered with an insulating silica coating 30 etched in the same way as in FIG. 2b. In this embodiment, the first dark deposit 22 takes place level with the insulating coating 30.

FIG. 7 shows a fifth embodiment of the display according to the invention. In this embodiment, as in the first embodiment, the insulating wall 8 is covered by electrode 12 and then by the insulating coating 30 etched in accordance with the motifs 32 to be displayed. The counter-electrode 14 covering insulating wall 10 is constituted by silver and, as hereinbefore, the light screen 24 is placed in front of this counter-electrode.

The second dark deposit 52 deposited on light screen 24 can, as hereinbefore, be in the form of an oxide deposit or a platinum deposit. This second dark deposit 52 is etched, as hereinbefore, in accordance with the motifs to be displayed (FIG. 2b). The dark deposit 52 can also be directly deposited by silk screen printing as a function of the desired geometry.

The different embodiments described hereinbefore make it possible to obtain a light electrolytic display on a dark background, as indicated in FIG. 8. Area 56, which represents the entire electrode surface which is free from segments 32 has a dark appearance obtained by the different dark deposits 42, 44, 46, 49 and 52. The excited segments 32a have the same dark appearance. This dark appearance is obtained by depositing absorbent silver by an electrochemical reaction. The unexcited segments 32b appear light on the display means. This light appearance is given by the presence of the porous screen 24. When the latter is uniformly covered, the unexcited segments 32b, i.e. the actual display, appear coloured. The composition of a coloured screen is described in French Patent Application No. 77 16676, to which reference has already been made.

The production of the display means will now be described in an exemplified manner with reference to the fourth embodiment (FIG. 6). The second dark deposit of platinum is sprayed in an argon and oxygen atmosphere onto a glass plate forming the first wall of the cell. The oxygen and argon concentrations, as well as the oxidized platinum spraying times can be varied so as to obtain a deposit having optical properties (appearance) which are as close as possible to the optical properties of the electrolytically deposited and absorbent silver (first dark deposit).

The motifs to be displayed are then etched in the platinum deposit, whilst eliminating the areas corresponding to the segments. The insulating silica coating is then deposited on the platinum deposit by chemical vapour deposition. The remainder of the front face (conductive oxide deposition, insulating coating deposition, etching of the insulating coating to remove the areas corresponding to the segments) the assembly of the cell and the filling of the latter are performed in the same way as for a conventional display.

We claim:

1. Electrolytic device for light display on a dark background comprising a light source (2) illuminating a cell formed by two insulating walls, namely a first transparent wall (8) and a second wall (10) spaced apart from said first wall, one of the said walls (8, 10) being provided with a first conductive coating (12) forming a transparent electrode constituted by a plurality of segments (32) constituting the actual display, the other of said walls (10, 8) being provided with a second conductive coating (14) forming the counter-electrode and positioned to face the electrode, an electrolyte (6) containing ions and inserted between the electrode and the counter-electrode and power supply means (18, 20) connected to electrode (12) and to counter-electrode (14), said display also being characterized in that it comprises means (22) for giving the selected segments (32a) of electrode (12) a first dark appearance, means (24) for giving non-selected segments (32b) of electrode (12) a light appearance, these non-selected segments being those which it is desired to display and means (42, 44, 46, 49, 52) for giving the entire surface of the electrode which is free from segments (56) a second dark appearance which is identical to the first, said means (22) for giving the first dark appearance being constituted by a first dark deposit obtained by an electrochemical reaction of the ions contained in the electrolyte (6).

2. Display according to claim 1, characterized in that the first dark deposit (22) is absorbent silver.

3. Display according to any one of the claims 1 and 2, characterized in that the means for giving the light appearance are constituted by a uniformly coloured porous screen (24) positioned in front of the conductive layer associated with the second wall (10) and in contact with the electrolyte (6).

4. Display according to any one of the claims 2, 3 and 1 characterized in that the means for giving the second dark appearance are constituted by a second conductive dark deposit (42, 44, 46, 49, 52).

5. Display according to claim 4, characterized in that the second conductive deposit is absorbent silver (42) obtained by electrochemical reaction from the ions contained in the electrolyte (6).

6. Display according to claim 4, characterized in that the second conductive deposit is of platinum (46, 49, 52) deposited in an oxygen atmosphere.

7. Display according to any one of the claims 2, 3 and 1, characterized in that the means for giving the second dark appearance are constituted by a second insulating dark deposit (44).

8. Display according to claim 7, characterized in that the second insulating deposit (44) is an oxide chosen from the group including $Al_2O_{3-x}$ and $Ta_2O_{3-x}$ in which x is a number below 3.

9. Display according to any one of the claims 6 to 8, characterized in that the second dark deposit is covered by a first transparent insulating coating (48, 50).

10. Display according to claims 4 and 7, characterized in that the second dark deposit (42, 44, 46, 49, 52) is formed selectively outside segments (32) of electrode (12).

11. Display according to any one of the claims 2 to 10 and 1, characterized in that electrode (12) is covered with a second transparent insulating coating (30) etched according to the shape of the segments (32) of the electrode.

12. Display according to claim 5 and 11, characterized in that the second insulating coating (30) is covered with a transparent, conductive oxide coating (36) placed on the surface of the electrode free from segments (56), said conductive coating being provided with an insulating border (40) between electrode (12) and conductive oxide coating (36) and in that the second dark deposit (42) is placed on the conductive coating.

13. Display according to any one of the claims 4 to 7, characterized in that the second dark deposit (44, 46) is placed directly on electrode (12).

14. Display according to any one of the claims 4, 6, 7, 10, 11, characterized in that the second dark deposit (49) is placed between electrode (12) and the corresponding wall (8).

15. Display according to any one of the claims 4, 6, 7, 11, 12, characterized in that the second dark deposit (52) is placed on the porous screen (24).

16. Display according to either of the claims 7 and 11, characterized in that the first insulating coating (48, 50) and the second insulating coating (30) are made from silica.

* * * * *